United States Patent
Kagimoto

(10) Patent No.: US 10,744,822 B2
(45) Date of Patent: Aug. 18, 2020

(54) HEAVY DUTY TIRE

(71) Applicant: Sumitomo Rubber Industries, Ltd., Kobe-shi, Hyogo (JP)

(72) Inventor: Shuji Kagimoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 257 days.

(21) Appl. No.: 15/788,936

(22) Filed: Oct. 20, 2017

(65) Prior Publication Data

US 2018/0134090 A1     May 17, 2018

(30) Foreign Application Priority Data

Nov. 11, 2016   (JP) ................................ 2016-220893

(51) Int. Cl.
| | | |
|---|---|---|
| *B60C 11/01* | (2006.01) | |
| *B60C 11/03* | (2006.01) | |
| *B60C 11/12* | (2006.01) | |
| *B60C 11/04* | (2006.01) | |

(52) U.S. Cl.
CPC .......... *B60C 11/0306* (2013.01); *B60C 11/01* (2013.01); *B60C 11/1236* (2013.01); *B60C 11/04* (2013.01); *B60C 2011/0344* (2013.01); *B60C 2011/0346* (2013.01); *B60C 2011/0353* (2013.01); *B60C 2011/0362* (2013.01); *B60C 2011/1213* (2013.01); *B60C 2200/06* (2013.01)

(58) Field of Classification Search
CPC . B60C 11/0306; B60C 11/01; B60C 11/1236; B60C 2011/0346; B60C 2011/1213; B60C 2011/0353; B60C 2011/0362
See application file for complete search history.

(56) References Cited

U.S. PATENT DOCUMENTS

| | | | | |
|---|---|---|---|---|
| 6,371,179 B1 * | 4/2002 | Tsuda | ...................... | B60C 11/01 |
| | | | | 152/209.16 |
| 2014/0238568 A1 * | 8/2014 | Haga | ................... | B60C 11/0309 |
| | | | | 152/209.18 |

FOREIGN PATENT DOCUMENTS

| | | | |
|---|---|---|---|
| DE | 102012104799 A1 | * | 12/2013 |
| JP | 8-282213 A | | 10/1996 |
| JP | 2005-329795 A | * | 12/2005 |

OTHER PUBLICATIONS

Machine translation for German 102012104799 (Year: 2019).*
Machine translation for JP 2005-329795 (Year: 2019).*

* cited by examiner

*Primary Examiner* — Steven D Maki
(74) *Attorney, Agent, or Firm* — Birch, Stewart, Kolasch & Birch, LLP

(57) ABSTRACT

A heavy duty tire comprises a tread portion 2 divided into two crown land regions 6, two middle land regions 7 and two shoulder land regions 8 by a center circumferential groove 3 having a width Wc, two middle circumferential grooves 4 having a width Wm and two shoulder circumferential grooves 5 having a width Ws. The distance LA from the shoulder circumferential groove 5 to the tire equator Co is more than the distance LB from the shoulder circumferential groove 5 to the tread edge TE. The width Wc and width Wm are more than 3.0 mm and less than 6.0 mm. The width Ws is more than 5.0 mm, and more than the width Wc and more than the width Wm. The crown and middle land regions 6 and 7 are each formed as a rib. The shoulder land regions 8 are each formed as a row of shoulder blocks 13.

8 Claims, 4 Drawing Sheets

HEAVY DUTY TIRE

TECHNICAL FIELD

The present invention relates to a heavy duty tire, more particularly to a tread pattern capable of improving tread center wear without sacrificing wet performance of the tire.

BACKGROUND ART

In a heavy duty tire whose tread portion is provided with two shoulder regions respectively defined as being axially outside two shoulder main grooves and a crown region defined between the two shoulder regions, so called tread center wear where the crown region wears more than the other regions is liable to occur when the tire is mounted on a drive axle of a heavy duty vehicle such as truck and bus. This is because the drive power of the heavy duty vehicle is especially large, and the contour of the tread portion of the tire is convexly curved such that the diameter of the tire becomes larger in the crown region than in the shoulder regions, and the crown region is subjected to the drive power more than the shoulder regions.

Heretofore, in order to reduce such tread center wear, the rigidity of the tread portion is increased in the crown region by increasing the ground contacting area of the ground contacting elements such as blocks and/or ribs formed in the crown region.
However, if the ground contacting area is increased in the crown region, widths of grooves formed in the crown region are decreased and wet performance is deteriorated.

Japanese Patent Application Publication No. H08-282213 discloses a heavy duly tire, wherein, in order to increase the uneven wear resistance, the axial distance from the tire equator to the widthwise center line of each shoulder circumferential groove is set in a rage from 0.25 to 0.40 times the tread width, and the crown region is divided into blocks by narrow axial grooves and narrow circumferential grooves.
Even in such tire, however, results which can completely satisfy both the tread center wear and the wet performance are not yet obtained.

SUMMARY OF THE INVENTION

It is therefore, an object of the present invention to provide a heavy duty tire in which the tread center wear is improved without sacrificing the wet performance.

According to the present invention, a heavy duty tire comprises:
a tread portion provided with a center circumferential groove disposed on the tire equator, an axially outer shoulder circumferential groove disposed on each side of the tire equator, a middle circumferential groove disposed between the center circumferential groove and each of the shoulder circumferential grooves so that the tread portion is axially divided into two crown land regions between the middle circumferential grooves and the center circumferential groove, two middle land regions between the middle circumferential grooves and the shoulder circumferential grooves, and two shoulder land regions axially outside the shoulder circumferential grooves, wherein
each of the crown land regions and the middle land regions is a circumferentially continuously extending rib,
each of the shoulder land regions is provided with shoulder axial grooves extending across the entire axial width of the shoulder land region and divided into shoulder blocks, on each side of the tire equator, an axial distance LA from the center line of the shoulder circumferential groove to the tire equator is more than an axial distance LB from the center line of the shoulder circumferential groove to the tread edge,
a groove width Wc of the center circumferential groove is more than 3.0 mm and less than 6.0 mm,
a groove width Wm of each of the middle circumferential grooves is more than 3.0 mm and less than 6.0 mm, and
a groove width Ws of each of the shoulder circumferential grooves is more than 5.0 mm, and more than the groove width Wc and the groove width Wm.

Preferably, each of the shoulder blocks is provided with an auxiliary shoulder axial groove extending parallel with the adjacent shoulder axial grooves, and the groove depth of the auxiliary shoulder axial groove is less than the groove depth of the adjacent shoulder axial grooves.

Preferably, each of the crown land regions is provided with crown sipes extending across the entire axial width of the crown land region, and
each of the middle land regions is provided with middle sipes extending across the entire axial width of the middle land region.

Preferably, each of the center circumferential groove, the middle circumferential grooves and the shoulder circumferential grooves is a zigzag groove having a portion which has a certain constant width and extends linearly in the tire circumferential direction within the width of the zigzag groove.

Preferably, the axially outer edge of each of the shoulder blocks is curved convexly to the axially outside in the form of an arc.

In this application including specification and claims, various dimensions, positions and the like of the tire refer to those under a normally inflated unloaded condition of the tire unless otherwise noted.

The tread edges TE are the axial outermost edges of the ground contacting patch of the tire which occurs under a normally inflated loaded condition when the camber angle of the tire is zero.

The tread width is the width measured under the normally inflated unloaded condition, as the axial distance between the tread edges TE determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.
The standard pressure and the standard tire load are the maximum air pressure and the maximum tire load for the tire specified by the same organization in the Air-pressure/Maximum-load Table or similar list.
For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The term "groove width" means a width of a groove measured perpendicularly to the longitudinal direction of the groove at the groove top at the tread.

The term "sipe" means a very narrow groove whose groove width is less than 1.5 mm inclusive of a cut having no substantial width.

Therefore, in the heavy duty tire according to the present invention, by a synergetic result from the axial distance LA more than the axial distance LB, the crown and middle land regions formed as ribs, and the specifically defined groove widths of the circumferential grooves, the tread pattern rigidity in the crown region is increased to suppress the tread center wear while securing the drainage (wet performance).

DESCRIPTION OF THE PREFERRED EMBODIMENTS

An embodiment of the present invention will now be described in detail in conjunction with accompanying drawings.

A heavy duty tire 1 as an embodiment of the present invention is a pneumatic tire comprising a tread portion 2 whose outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion as well known in the art.

Figure 1:
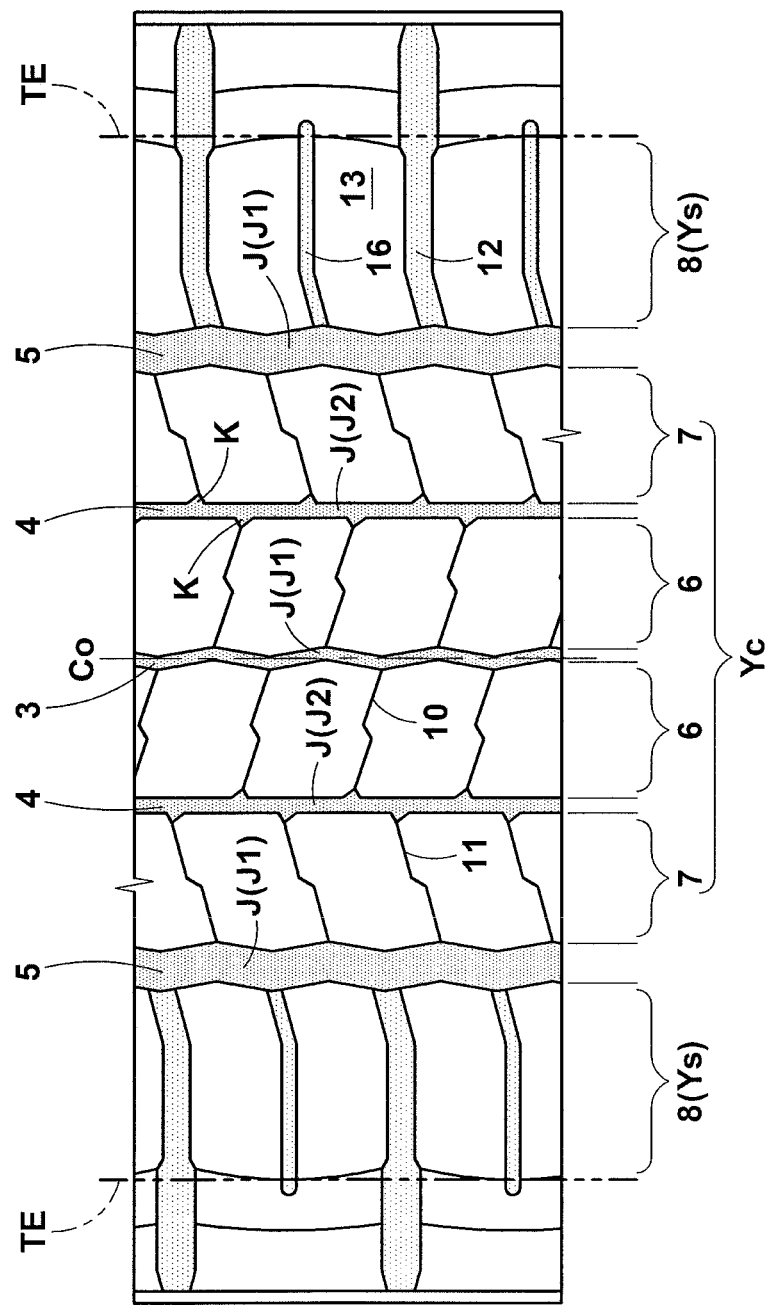
FIG. 1 is a developed partial view of the tread portion of a heavy duty tire according to the present invention showing a tread pattern.

As shown in FIG. 1, the tread portion 2 is provided with circumferentially continuously extending circumferential grooves which are a center circumferential groove 3 disposed on the tire equator Co, a middle circumferential groove 4 disposed on each side in the tire axial direction of the center circumferential groove 3, a shoulder circumferential groove 5 disposed axially outside each of the middle circumferential grooves 4.

The tread portion 2 is therefore, axially divided into two crown land regions 6 between the middle circumferential grooves 4 and the center circumferential groove 3, two middle land regions 7 between the middle circumferential grooves 4 and the shoulder circumferential grooves 5, and two shoulder land regions 8 axially outside the respective shoulder circumferential grooves 5.

In the tread or ground contacting area of the tread portion 2, a region between the shoulder circumferential grooves 5 is called "crown region Yc", and a region axially outside each of the shoulder circumferential grooves 5 is called "shoulder region Ys".

In this embodiment, the center circumferential groove 3, the middle circumferential grooves 4 and the shoulder circumferential grooves 5 are each formed as a zigzag groove J in order to increase the axial component of the groove edges to improve the traction.

Here, the zigzag groove J means:

a first type zigzag groove J1 made up of alternate first segments and second segments wherein the first segments are inclined with respect to the tire circumferential direction to one axial direction, and the second segments are inclined with respect to the tire circumferential direction to the opposite axial direction to the first groove segments;

a second type zigzag groove J2 having linearly extending side walls provided with indentations K staggered; and a third type zigzag groove J3 (not shown) made up of alternate first segments and second segments which are alternately smoothly curved in arc forms.

The first type zigzag groove J1 is superior in the traction whereas the second type zigzag groove J2 is superior in the drainage.

In this embodiment, the center circumferential groove 3 and the shoulder circumferential grooves 5 are the first type zigzag groove J1. The middle circumferential grooves 4 are the second type zigzag groove J2.

Figure 2:
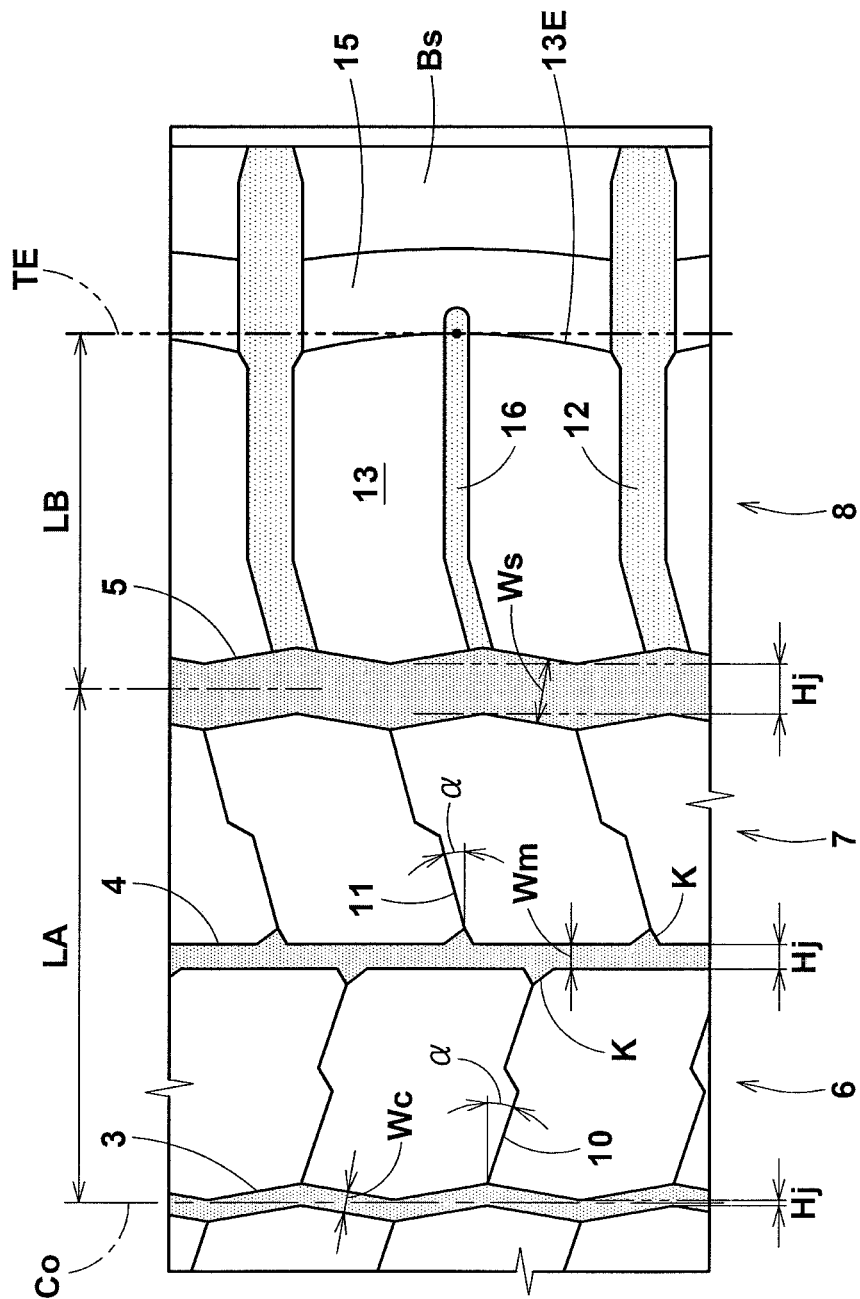
FIG. 2 is an enlarged view showing a part of FIG. 1.

As shown in FIG. 2, each of the zigzag grooves J or the circumferential grooves 3, 4 and 5 has a portion Hj, which is defined as having a certain constant width and extending linearly in the tire circumferential direction, within the width of the zigzag groove in order to provide good drainage performance.

As shown in FIG. 2, the axial distance LA from the center line of each shoulder circumferential groove 5 to the tire equator Co is more than the axial distance LB from the center line of the same shoulder circumferential groove 5 to the tread edge TE.

Here, in the case of a zigzag groove, the center line is the center line of the zigzag amplitude of the groove. In the case of a straight groove, the center line is the widthwise center line of the straight groove.

The groove width Wc of the center circumferential groove 3 is set to be more than 3.0 mm and less than 6.0 mm. The groove width Wm of each of the middle circumferential grooves 4 is set to be more than 3.0 mm and less than 6.0 mm. The groove width Ws of each of the shoulder circumferential grooves 5 is set to be more than 5.0 mm, and more than the groove width Wc and the groove width Wm.

By setting the axial widths LA and LB as LA>LB as explained above, the crown region Yc becomes wider than the shoulder region Ys and the prerequisite for increasing the tread pattern rigidity in the crown region Yc is upheld.

Further, by setting the groove widths Wc and Wm of the circumferential grooves 3 and 4 disposed in the crown region Yc in a range between more than 3.0 mm and less than 6.0 mm, it becomes possible to form the crown land regions 6 and the middle land regions 7 as being wide while securing the drainage. Furthermore, the crown land regions 6 and the middle land regions 7 are formed as circumferentially continuously extending ribs.

By the combination of those actions, it is possible to increase the tread pattern rigidity in the crown region Yc to suppress the tread center wear while securing the drainage.

If LA≤LB, it becomes necessary to reduce the groove widths Wc and Wm in order to increase the tread pattern rigidity in the crown region Yc, therefore, the drainage is deteriorated. Alternatively, it becomes impossible to sufficiently increase the tread pattern rigidity in the crown region Yc.

Based on this standpoint, the ratio LA/LB is preferably not less than 1.10, more preferably not less than 1.20.

If LA/LB is too large, the tread pattern rigidity in the shoulder regions Ys is decreased, and the steering stability is deteriorated.

Based on this standpoint, the LA/LB is preferably not more than 1.40, more preferably not more than 1.30.

If the groove widths Wc and Wm are less than 3.0 mm, the drainage becomes insufficient.

If the groove widths Wc and Wm are more than 6.0 mm, the improving of the tread center wear becomes insufficient although the drainage is improved.

If the groove width Ws is less than 5.0 mm and less than the groove widths Wc and Wm, the drainage becomes insufficient although the tread center wear is improved.

The groove depths DG of the center circumferential groove J, the middle circumferential grooves 4 and the shoulder circumferential grooves 5 are preferably set in a range from 15 to 18 mm.

In this embodiment, each of the crown land regions 6 is provided with crown sipes 10 extending across the entire width of the crown land region 6.

Further, each of the middle land regions 7 is provided with middle sipes 11 extending across the entire width of the middle land region 7.

The crown sipes 10 and middle sipes 11 are closed when in the ground contact patch, and the tread pattern rigidity is maintained. Further, the crown sipes 10 and middle sipes 11 improve the wet performance since the sipes' edges can break through a water film covering the road surface, and at the same time, the sipes can absorb the water on the road surface.

The crown sipes 10 and the middle sipes 11 are each inclined with respect to the tire axial direction at an angle α of not more than 30 degrees for example.

On each side of the tire equator, the crown sipes 10 are inclined with respect to the tire axial direction to one circumferential direction, whereas the middle sipes 11 are inclined with respect to the tire axial direction to the other circumferential direction opposite to the crown sipes 10.

The crown sipes 10 on both sides of the tire equator are inclined in the same direction.

Of the ends of the center and middle sipes 10 and 11, the ends positioned on both sides of each of the circumferential grooves 3 and 4 and connected thereto are staggered in order to uniform the rigidity of the crown region Yc.

Further, the ends of the center and middle sipes 10 and 11 are respectively connected to the bent points of the first type zigzag groove J1 and the indentations K of the second type zigzag groove J2 as shown in FIG. 1.

Each of the shoulder land regions 8 is provided with shoulder axial grooves 12 extending across the entire width of the shoulder land region 8 so that the shoulder land region 8 is circumferentially divided into shoulder blocks 13 in a row.

Figure 3:
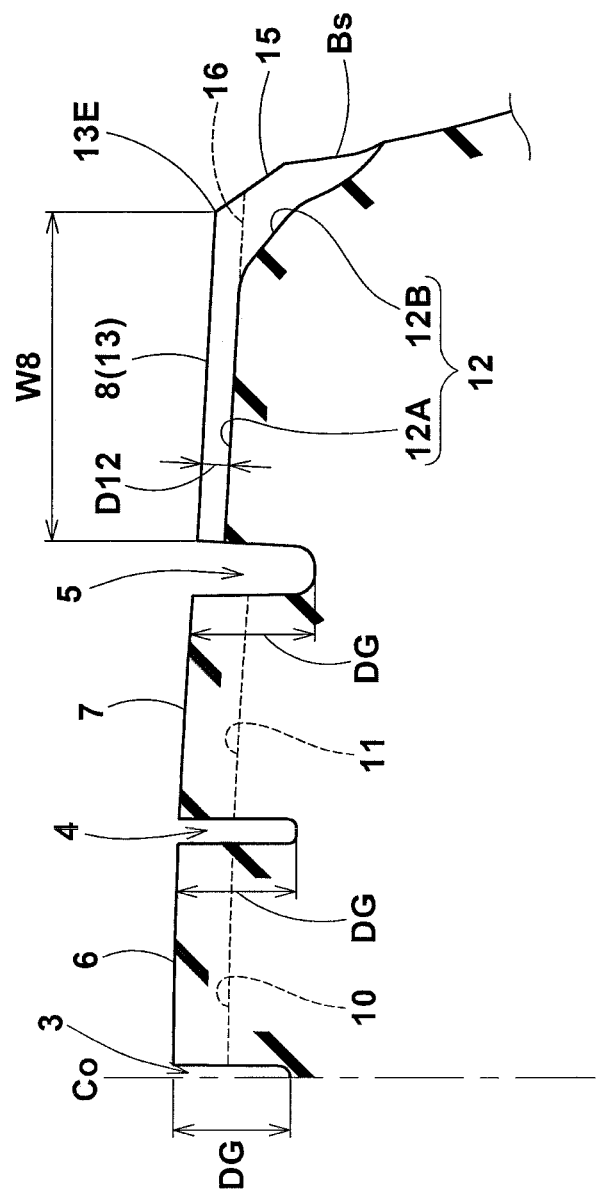
FIG. 3 is a tire meridian cross sectional view of a part of the tread portion.

As shown in FIG. 3, from a viewpoint of the groove depth, each of the shoulder axial grooves 12 is composed of a main portion 12A having a constant groove depth D12 and extending over at least 70% of the axial width W8 of the shoulder land region 8 from the shoulder circumferential groove 5, and an axially outer end portion 12B extending from the main portion 12A while increasing the depth to open at the buttress surface Bs or the outer surface of the radially outermost part of the tire sidewall.

The groove depth D12 of the main portion 12A is less than the groove depth DG of the shoulder circumferential groove 5, preferably not more than 50%, more preferably not more than 30% of the groove depth DG.

Such shallow shoulder axial grooves 12 can maintain the rigidity of the shoulder blocks 13, and the tread pattern rigidity is balanced between the crown region Yc and the shoulder regions Ys.

Figure 4:
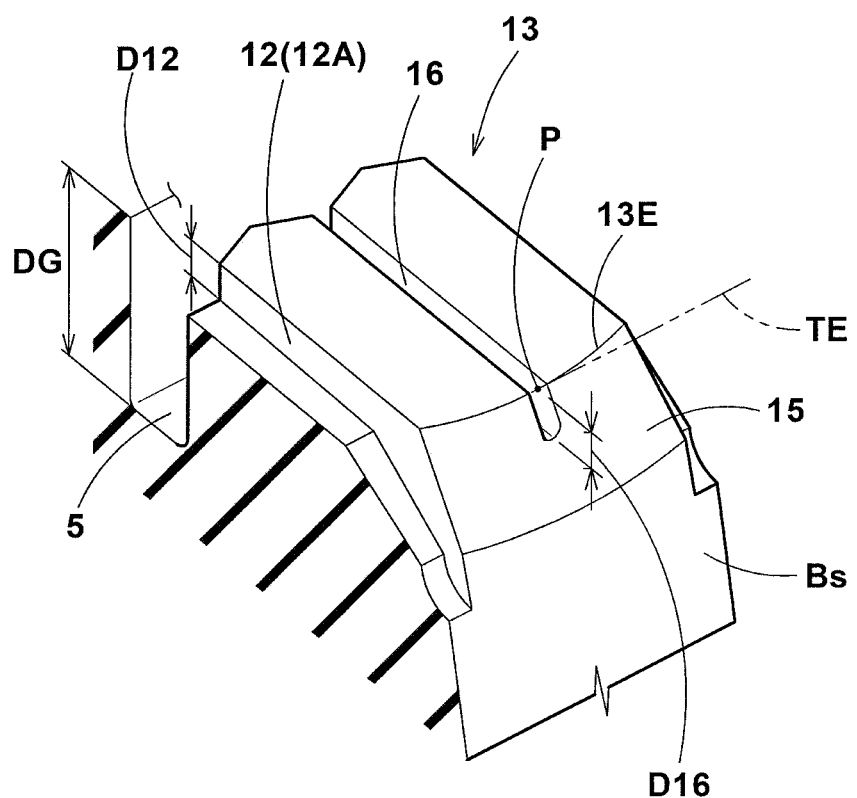
FIG. 4 is a perspective view showing a shoulder block.

In this embodiment, as shown in FIG. 4, the axially outer edge 13E of each of the shoulder blocks 13 is curved convexly toward the axially outside in the form of an arc in order to improve the wandering performance of the tire. Incidentally, the tread edge TE is positioned at the axially outermost point P of the outer edge 13E as defined as above.

In this embodiment, in order to further improve the wandering performance, the axially outer surface 15 of each shoulder block 13 extending radially inwardly from the outer edge 13E to the above-mentioned buttress surface BS is formed as a part of a conic surface inclined to the axially outside.

The shoulder blocks 13 are each provided with an auxiliary axial groove 16 extending parallel with the shoulder axial grooves 12 on both sides of the shoulder block, and having a width narrower than the shoulder axial grooves 12. The auxiliary axial groove 16 extends across the entire width of the shoulder block 13 and has a constant groove depth D16 along the entire length thereof.

The groove depth D16 is not more than the above-mentioned groove depth D12 of the main portion 12A of the shoulder axial groove 12.

The auxiliary axial grooves 16 improve the drainage and traction performance while maintaining the rigidity of the shoulder blocks 13.

In this embodiment, each of the shoulder axial grooves 12 and the auxiliary axial groove 16 is a bent groove as shown in FIGS. 1 and 2, although those in FIG. 4 are illustrated as straight grooves for the sake of simplicity.

Nevertheless, it may be possible to form the shoulder axial grooves 12 and the auxiliary axial groove 16 as straight grooves as shown in FIG. 4.

While detailed description has been made of an especially preferable embodiment of the present invention, the present invention can be embodied in various forms without being limited to the illustrated embodiment.

Comparison Tests

Based on the tread pattern shown in FIG. 1, pneumatic tires of size 315/80R22.5 (rim size 22.5×9.00) for heavy duty vehicles were experimentally manufactured as test tires (Embodiment tires Ex. 1-Ex. 4 and Comparative tires Ref. 1-Ref. 7) and tested for the resistance to tread center wear and wet performance.

In the comparative tire Ref. 2, a groove width of 2 mm (outside the range for the sipes) was given to the crown sipes and the middle sipes, in other words, those sipes were formed as narrow grooves.

Other than the specifications listed in Table 1, the test tires had the same specifications.

Common specifications are as follows:
Center circumferential groove depth DG: 17.0 mm
Middle circumferential groove depth DG: 17.0 mm
Shoulder circumferential groove depth DG: 17.0 mm
Shoulder axial groove depth D12: 4.0 mm
Auxiliary axial groove depth D16: 4.0 mm
Tread width: 280 mm
<Resistance to Tread Center Wear>

The test was conducted using a 10-ton truck provided on all wheels with test tires inflated to 830 kPa and loaded with 50% of the load capacity on a front part of the rear deck. After running for 40000 km, the drive axle tires were measured to obtain (1) an average value of the amounts of wear at the positions of the center circumferential groove and middle circumferential grooves, and (2) an average value of the amounts of wear at the positions of the axially outer side walls of the respective shoulder circumferential grooves. Then, the difference between the average values (1) and (2) was calculated. The difference is indicated in Table 1 by an index based on Embodiment tire Ex. 1 being 100, wherein the larger the value, the higher the resistance to tread center wear. If the index value is under 90, the resistance to tread center wear is considered as not good.

<Wet Performance>

The test was conducted similarly using a 10-ton truck provided on all wheels with test tires (tire pressure 830 kPa) and loaded with 50% of the load capacity on a front part of the rear deck, but the tread portions of the test tires were worn 75%. On an asphalt road surface covered with 5 mm depth water, the truck was started under such a condition that the transmission was fixed to the second gear and the rotating speed of the engine was fixed to 1500 rpm, and the time required to run for 10 meters was measured immediately after the clutch was engaged. The reciprocal of the time is indicated in Table 1 by an index based on Embodiment tire Ex. 1 being 100, wherein the larger the value, the better the wet performance. If the index value is under 90, the wet performance is considered as not good.

TABLE 1

| Tire | Ref. 1 | Ref. 2 | Ex. 1 | Ex. 2 | Ref. 3 | Ref. 4 | Ref. 5 | Ref. 6 | Ref. 7 | Ex. 3 | Ex. 4 |
|---|---|---|---|---|---|---|---|---|---|---|---|
| crown region width LA(mm) | 50 | 75 | 75 | 75 | 75 | 75 | 75 | 75 | 75 | 74 | 82 |
| shoulder region width LB (mm) | 90 | 65 | 65 | 65 | 65 | 65 | 65 | 65 | 65 | 66 | 58 |
| LA/LB | 0.56 | 1.15 | 1.15 | 1.15 | 1.15 | 1.15 | 1.15 | 1.15 | 1.15 | 1.10 | 1.40 |
| center circumferential groove width Wc (mm) | 4 | 4 | 4 | 5 | 2 | 3 | 6 | 8 | 4 | 4 | 4 |
| middle circumferential groove width Wm (mm) | 4 | 4 | 4 | 5 | 2 | 3 | 6 | 8 | 4 | 4 | 4 |
| shoulder circumferential groove width Ws (mm) | 10 | 10 | 10 | 10 | 10 | 10 | 10 | 10 | 5 | 10 | 10 |
| tread center wear resistance | 80 | 75 | 100 | 95 | 115 | 110 | 85 | 75 | 100 | 100 | 120 |
| wet performance | 100 | 115 | 100 | 105 | 75 | 85 | 110 | 115 | 80 | 100 | 90 |
| Total | 180 | 190 | 200 | 200 | 190 | 195 | 195 | 190 | 180 | 200 | 210 |

From the test results, it was confirmed that the tires according to the present invention can be improved in the resistance to the tread center wear while securing the wet performance.

REFERENCE SIGNS LIST 1 heavy duty tire
2 tread portion
3 center circumferential groove
4 middle circumferential groove
5 shoulder circumferential groove
6 crown land region
7 middle land region
8 shoulder land region
10 crown sipe
11 middle sipe
12 shoulder axial groove
13 shoulder block
13E axially outer edge
TE tread edge

The invention claimed is:
1. A heavy duty tire comprising:
a tread portion provided with a center circumferential groove disposed on the tire equator, an axially outer shoulder circumferential groove disposed on each side of the tire equator, a middle circumferential groove disposed between the center circumferential groove and each of the shoulder circumferential grooves so that the tread portion is axially divided into two crown land regions between the middle circumferential grooves and the center circumferential groove, two middle land regions between the middle circumferential grooves and the shoulder circumferential grooves, and two shoulder land regions axially outside the shoulder circumferential grooves,
wherein
each of the crown land regions and the middle land regions is a circumferentially substantially continuously extending rib,
each of the shoulder land regions is provided with shoulder axial grooves extending across the entire axial width of the shoulder land region and divided into shoulder blocks,
on each side of the tire equator, an axial distance LA from the center line of the shoulder circumferential groove to the tire equator is more than an axial distance LB from the center line of the shoulder circumferential groove to the tread edge,
a groove width Wc of the center circumferential groove is more than 4.0 mm and less than 6.0 mm,
a groove width Wm of each of the middle circumferential grooves is more than 4.0 mm and less than 6.0 mm,
a groove width Ws of each of the shoulder circumferential grooves is more than 5.0 mm, and more than the groove width Wc and the groove width Wm,
wherein
each of the shoulder blocks is provided with an auxiliary axial groove extending across the entire axial width of the shoulder block in parallel with the shoulder axial grooves,
each of the crown land regions is provided with crown sipes extending across the entire axial width of the crown land region, and
each of the middle land regions is provided with middle sipes extending across the entire axial width of the middle land region.
2. The heavy duty tire according to claim 1, wherein each of the center circumferential groove, the middle circumfer- ential grooves and the shoulder circumferential grooves is a zigzag groove having a portion which has a certain constant width and extends linearly in the tire circumferential direction within the width of the zigzag groove.

3. The heavy duty tire according to claim 2, wherein an axially outer edge of each of the shoulder blocks is curved convexly toward the axially outside in the form of an arc.

4. The heavy duty tire according to claim 1, wherein
each of the center circumferential groove and the shoulder circumferential grooves is a first zigzag groove made up of alternate first segments and second segments wherein the first segments are inclined with respect to the tire circumferential direction to one axial direction, and the second segments are inclined with respect to the tire circumferential direction to the opposite axial direction to the first groove segments, and
each of the middle circumferential grooves is a second zigzag groove having linearly extending side walls provided with indentations staggered.

5. The heavy duty tire according to claim 4, wherein both ends of each of the crown sipes and the middle sipes are respectively connected to one of bent points of the first zigzag groove and one of the indentations of the second zigzag groove.

6. The heavy duty tire according to claim 5, wherein
the crown sipes and the middle sipes are each inclined with respect to the tire axial direction at an angle of not more than 30 degrees,
the crown sipes are inclined with respect to the tire axial direction to one circumferential direction, whereas the middle sipes are inclined with respect to the tire axial direction to the other circumferential direction opposite to the crown sipes, and
of the ends of the crown sipes and the middle sipes, the ends positioned on both sides of each of the center and middle circumferential grooves and connected thereto are staggered.

7. The heavy duty tire according to claim 6, wherein the crown sipes and the middle sipes are bent in a crank shape.

8. The heavy duty tire according to claim 7, wherein each of the shoulder axial grooves and the auxiliary axial grooves is a bent groove composed of an axially inner portion inclined with respect to the tire axial direction and an axially outer portion extending in the tire axial direction.

* * * * *